US011927327B1

(12) United States Patent
Scheurle

(10) Patent No.: US 11,927,327 B1
(45) Date of Patent: Mar. 12, 2024

(54) MULTIPURPOSE BRACKET AND A METHOD USING THE SAME

(71) Applicant: Dawn Scheurle, Dublin, OH (US)

(72) Inventor: Dawn Scheurle, Dublin, OH (US)

( * ) Notice: Subject to any disclaimer, the term of this patent is extended or adjusted under 35 U.S.C. 154(b) by 0 days.

(21) Appl. No.: 17/883,586

(22) Filed: Aug. 8, 2022

Related U.S. Application Data

(63) Continuation-in-part of application No. 16/796,690, filed on Feb. 20, 2020, now abandoned.

(60) Provisional application No. 62/808,990, filed on Feb. 22, 2019.

(51) Int. Cl.
*F21V 21/08* (2006.01)
*F16M 13/02* (2006.01)
*F21S 4/10* (2016.01)

(52) U.S. Cl.
CPC ........... *F21V 21/08* (2013.01); *F16M 13/022* (2013.01); *F21S 4/10* (2016.01)

(58) Field of Classification Search
CPC ........... F21V 21/08; F16M 13/022; F21S 4/10
See application file for complete search history.

(56) References Cited

U.S. PATENT DOCUMENTS

| 281,297 A * | 7/1883 | Pratt | A47G 25/92 24/40 |
| 355,491 A * | 1/1887 | Wiley | H02G 7/10 248/61 |
| 1,246,864 A | 11/1917 | Brion | |
| 1,720,746 A | 7/1929 | Povlsen et al. | |
| 1,747,892 A * | 2/1930 | Fisher | A47G 33/10 24/372 |
| 1,771,482 A | 7/1930 | Boye | |
| 1,895,656 A | 1/1933 | William | |
| D171,247 S | 1/1954 | Charnota | |
| 2,909,354 A | 10/1959 | Bingham | |
| 2,992,805 A | 7/1961 | Weldon | |
| 3,033,403 A | 5/1962 | Robert | |
| 3,181,827 A | 5/1965 | Sassin | |
| 3,584,795 A | 6/1971 | Baird | |
| 3,596,859 A | 8/1971 | MacDonald | |
| 4,333,187 A * | 6/1982 | Schuler | A47K 3/38 4/608 |
| 5,056,747 A | 10/1991 | Kireta | |
| 5,425,518 A | 6/1995 | Czerniak | |

(Continued)

FOREIGN PATENT DOCUMENTS

| AU | 2013101357 A4 | 11/2013 |
| CN | 103688097 B | 3/2016 |

*Primary Examiner* — Kimberly T Wood
(74) *Attorney, Agent, or Firm* — The Law Office of Patrick F. O'Reilly III, LLC

(57) ABSTRACT

A multipurpose bracket is disclosed herein. The multipurpose bracket includes a body portion having a first side and a second side, the first side of the body portion being oppositely disposed relative to the second side of the body portion; a first hook portion attached to the first side of the body portion, the first hook portion being inwardly directed towards a middle of the body portion, the first hook portion defining a first channel for receiving a first wiring portion of a light strand; and a second hook portion attached to the second side of the body portion, the second hook portion being inwardly directed towards the middle of the body portion, the second hook portion defining a second channel for receiving a second wiring portion of the light strand.

15 Claims, 15 Drawing Sheets

(56) References Cited

U.S. PATENT DOCUMENTS

| | | | |
|---|---|---|---|
| 5,515,582 A | 5/1996 | Trowbridge | |
| 6,048,077 A | 4/2000 | Pan | |
| D431,182 S | 9/2000 | Szukhent, Jr. | |
| 6,190,021 B1 | 2/2001 | Huang | |
| 6,243,923 B1 | 6/2001 | Hamilton | |
| 6,470,819 B2 * | 10/2002 | Silberman | B63B 17/00 114/219 |
| 6,527,413 B1 | 3/2003 | McIngvale | |
| 6,644,836 B1 * | 11/2003 | Adams | F21V 21/08 362/147 |
| 6,663,069 B1 | 12/2003 | Norberg | |
| D495,348 S | 8/2004 | Brasseur | |
| 7,059,749 B1 | 6/2006 | Bernier | |
| 7,107,654 B2 | 9/2006 | Byers | |
| 7,230,181 B2 * | 6/2007 | Simmons | H02G 11/02 439/4 |
| 7,249,866 B1 | 7/2007 | Tai | |
| 7,410,137 B2 | 8/2008 | Diggle et al. | |
| 7,547,110 B2 | 6/2009 | Vaught | |
| 7,690,612 B1 | 4/2010 | Branson | |
| D651,067 S | 12/2011 | Johnson, III | |
| 8,070,111 B1 | 12/2011 | Zeller | |
| 8,469,322 B1 | 6/2013 | Oxley | |
| D695,973 S | 12/2013 | Carrs | |
| 9,273,803 B2 | 3/2016 | Adams | |
| 9,334,887 B2 | 5/2016 | Leo, II | |
| 9,797,584 B2 | 10/2017 | Andretta-Pulera | |
| 9,964,291 B1 | 5/2018 | Del Rio | |
| 10,443,825 B2 | 10/2019 | Kennedy | |
| 10,641,470 B1 | 5/2020 | Smyth | |
| 10,914,461 B2 * | 2/2021 | Jackson | F21V 21/088 |
| 11,029,004 B2 | 6/2021 | Kennedy et al. | |
| 2002/0000504 A1 | 1/2002 | Bayne | |
| 2002/0163806 A1 | 11/2002 | Adams | |
| 2003/0235053 A1 | 12/2003 | Jones | |
| 2006/0108480 A1 | 5/2006 | Goodwin et al. | |
| 2006/0120089 A1 | 6/2006 | Liberatore | |
| 2006/0171147 A1 | 8/2006 | Day | |
| 2007/0008724 A1 | 1/2007 | Raska | |
| 2007/0041189 A1 * | 2/2007 | Mchinnis | F21S 4/10 362/249.04 |
| 2007/0131832 A1 | 6/2007 | Adams | |
| 2009/0072098 A1 | 3/2009 | Smallhorn | |
| 2009/0185370 A1 | 7/2009 | Moore | |
| 2010/0118554 A1 | 5/2010 | Kraus, Jr. et al. | |
| 2011/0108150 A1 | 5/2011 | Renaud | |
| 2012/0069587 A1 | 3/2012 | Holland | |
| 2012/0198680 A1 | 8/2012 | Durben et al. | |
| 2014/0299719 A1 | 10/2014 | Wolff | |
| 2016/0295811 A1 | 10/2016 | Rider | |
| 2017/0241603 A1 | 8/2017 | Freeman | |
| 2018/0017240 A1 | 1/2018 | Schreiber et al. | |
| 2018/0058670 A1 | 3/2018 | Mitchell et al. | |
| 2018/0187867 A1 | 7/2018 | Adams et al. | |
| 2019/0113156 A1 | 4/2019 | Herbert | |

\* cited by examiner

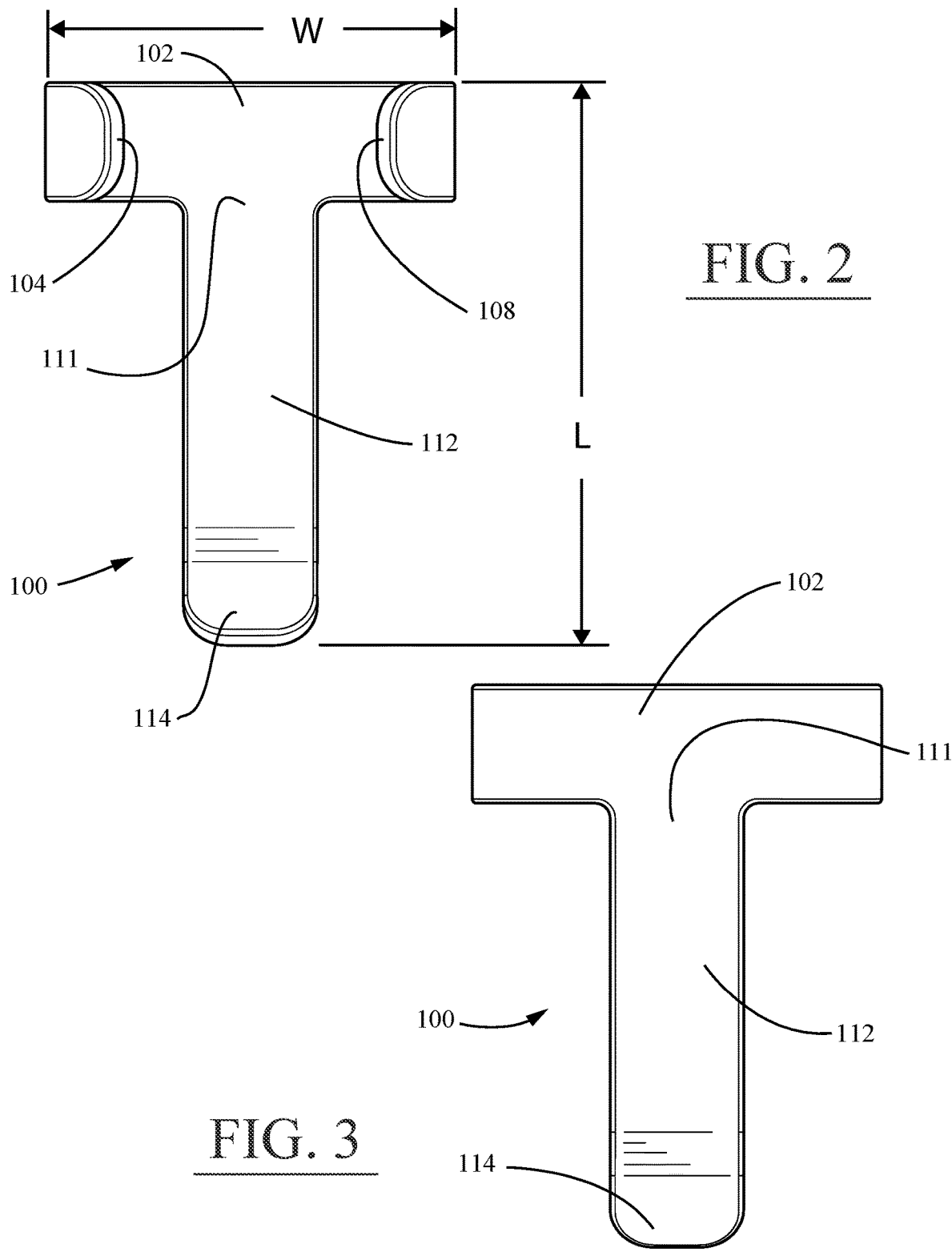

MULTIPURPOSE BRACKET AND A METHOD USING THE SAME

CROSS-REFERENCE TO RELATED APPLICATIONS

This is a continuation-in-part of U.S. patent application Ser. No. 16/796,690, entitled "Multipurpose Bracket", filed on Feb. 20, 2020, and further claims the benefit of U.S. Provisional Patent Application No. 62/808,990, entitled "Multipurpose Bracket", filed on Feb. 22, 2019, the disclosure of each of which is hereby incorporated by reference as if set forth in their entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

Illustrative embodiments of the present invention relate generally to brackets, and more specifically those used for wrapping string lights around objects.

2. Background

It is often difficult to hang string lights, such as Christmas lights, in the home or outdoors. During the holidays and for other celebratory purposes and decoration, many people wrap lights around trees and structures on their property. The standard for wrapping trees and structures with lights is to take the entire light string and wrap and weave it around the limbs or structure, which is cumbersome and time consuming. For trees that are very dense and/or are partially obstructed, it can be difficult to completely wrap the lights around the tree. The more difficult it is to wrap the tree, the harder it is to achieve a desirable lighting effect. Tree wrapping often becomes a multi-stage, high effort, and often two-person job. The difficulty in wrapping a tree with lights is equaled by the difficulty in unwrapping the lights from the tree.

Placing lights in the home can also present many challenges. For example, many people like to wrap their banisters with lights, but the banisters may be partially obstructed and/or built in such a way that lights cannot be fully wrapped around them. Even if they are not obstructed, it is time consuming and cumbersome to wrap the entire light string around and around the structure, feeding the entire light string around and through, around and through. This impacts the ability of homeowners to achieve a desirable lighting effect.

Therefore, what is needed is a multipurpose bracket that can overcome one or more of these aforementioned difficulties.

BRIEF SUMMARY OF EMBODIMENTS OF THE INVENTION

Accordingly, the present invention is directed to a multipurpose bracket that substantially obviates one or more problems resulting from the limitations and deficiencies of the related art.

In accordance with one or more embodiments of the present invention, there is provided a multipurpose bracket that includes a body portion having a first side and a second side, the first side of the body portion being oppositely disposed relative to the second side of the body portion; a first hook portion attached to the first side of the body portion, the first hook portion being inwardly directed towards a middle of the body portion, the first hook portion defining a first channel for receiving a first wiring portion of a light strand; and a second hook portion attached to the second side of the body portion, the second hook portion being inwardly directed towards the middle of the body portion, the second hook portion defining a second channel for receiving a second wiring portion of the light strand.

In a further embodiment of the present invention, the first hook portion and the second hook portion are disposed in an opposed relationship relative to one another.

In yet a further embodiment, the first hook portion and the second hook portion are integrally formed with the body portion.

In still a further embodiment, at least one of the first hook portion and the second hook portion are curved in an arc shape that approximates a half-circle configuration.

In yet a further embodiment, the multipurpose bracket further comprises a tab portion attached to the body portion, the tab portion configured to facilitate a holding of the multipurpose bracket by a user while the user is inserting the first and second wiring portions of the light strand into the multipurpose bracket or removing the first and second wiring portions of the light strand from the multipurpose bracket.

In still a further embodiment, the tab portion extends generally perpendicularly from a bottom of the body portion.

In yet a further embodiment, the tab portion comprises a first end and a second end, the second end being oppositely disposed relative to the first end, the first end being attached to the body portion, and the second end is angled outwardly slightly for facilitating the removal of the first and second wiring portions of the light strand from the multipurpose bracket.

In still a further embodiment, the first hook portion, the second hook portion, and the tab portion are integrally formed with the body portion.

In yet a further embodiment, the first hook portion is curved in an arc shape that approximates a three-quarter circle configuration.

In still a further embodiment, the multipurpose bracket further comprises an upturned end portion that is attached to the first hook portion which approximates the three-quarter circle configuration, the upturned end portion being angled outwardly slightly for facilitating the removal of the multipurpose bracket from a wiring portion of a light strand.

In yet a further embodiment, the second hook portion is curved in an arc shape that approximates a half-circle configuration.

In accordance with one or more other embodiments of the present invention, there is provided a multipurpose bracket that includes a body portion having a first side and a second side, the first side of the body portion being oppositely disposed relative to the second side of the body portion; a first hook portion attached to the first side of the body portion, the first hook portion being inwardly bent towards a middle of the body portion, the first hook portion defining a first channel for receiving a first wiring portion of a light strand; a second hook portion attached to the second side of the body portion, the second hook portion being inwardly bent towards the middle of the body portion, the second hook portion defining a second channel for receiving a second wiring portion of the light strand; and a tab portion attached to the body portion, the tab portion configured to facilitate a holding of the multipurpose bracket by a user while the user is inserting the first and second wiring portions of the light strand into the multipurpose bracket or removing the first and second wiring portions of the light strand from the multipurpose bracket.

In a further embodiment of the present invention, the first hook portion and the second hook portion are disposed in an opposed relationship relative to one another.

In yet a further embodiment, the first hook portion and the second hook portion are integrally formed with the body portion.

In still a further embodiment, at least one of the first hook portion and the second hook portion are curved in an arc shape that approximates a half-circle configuration.

In yet a further embodiment, the tab portion extends generally perpendicularly from a bottom of the body portion.

In still a further embodiment, the tab portion comprises a first end and a second end, the second end being oppositely disposed relative to the first end, the first end being attached to the body portion, and the second end is angled outwardly slightly for facilitating the removal of the first and second wiring portions of the light strand from the multipurpose bracket.

In yet a further embodiment, the first hook portion, the second hook portion, and the tab portion are integrally formed with the body portion.

In accordance with yet one or more other embodiments of the present invention, there is provided a method of using a multipurpose bracket, the method comprising the steps of: (i) providing an elongate object; (ii) providing a light strand having a first looped wiring portion, a second looped wiring portion, and a connecting wiring portion that connects the first looped wiring portion to the second looped wiring portion; (iii) providing at least one multipurpose bracket, the at least one multipurpose bracket including a body portion having a first side, a second side, a front surface, and a rear surface, the first side of the body portion being oppositely disposed relative to the second side of the body portion, the rear surface of the body portion being oppositely disposed relative to the front surface of the body portion; a first hook portion attached to the first side of the body portion, the first hook portion being inwardly directed towards a middle of the body portion, the first hook portion defining a first channel for receiving a first wiring portion of a light strand, and the front surface of the body portion facing the first channel; and a second hook portion attached to the second side of the body portion, the second hook portion being inwardly directed towards the middle of the body portion, the second hook portion defining a second channel for receiving a second wiring portion of the light strand, and the front surface of the body portion facing the second channel; (iv) inserting the first looped wiring portion of the light strand into the first channel defined by the first hook portion of the at least one multipurpose bracket; (v) wrapping an initial portion of the light strand around the elongate object; (vi) placing the rear surface of the body portion of the at least one multipurpose bracket against an outer surface of the elongate object around which the portion of the light strand is wrapped, the multipurpose bracket being disposed on a first side of the elongate object; (vii) wrapping the connecting wiring portion of the light strand around a second side of the elongate object that is opposite to the first side of the elongate object; and (viii) inserting the second looped wiring portion of the light strand into the second channel defined by the second hook portion of the at least one multipurpose bracket.

In a further embodiment of the present invention, the first hook portion of the at least one multipurpose bracket is curved in an arc shape that approximates a three-quarter circle configuration.

In yet a further embodiment, the at least one multipurpose bracket further comprises an upturned end portion that is attached to the first hook portion which approximates the three-quarter circle configuration, the upturned end portion being angled outwardly slightly for facilitating the removal of the multipurpose bracket from a wiring portion of a light strand.

In still a further embodiment, the second hook portion of the at least one multipurpose bracket is curved in an arc shape that approximates a half-circle configuration.

In yet a further embodiment, the first hook portion and the second hook portion of the at least one multipurpose bracket are disposed in an opposed relationship relative to one another.

In still a further embodiment, the first hook portion and the second hook portion of the at least one multipurpose bracket are integrally formed with the body portion.

In yet a further embodiment, the second looped wiring portion in the second channel of the at least one multipurpose bracket is generally aligned with the first looped wiring portion in the first channel of the at least one multipurpose bracket in a width direction of the at least one multipurpose bracket.

In still a further embodiment, the at least one multipurpose bracket comprises a plurality of multipurpose brackets, the plurality of multipurpose brackets including a first multipurpose bracket and a second multipurpose bracket that are disposed on the first side of the elongate object, and the first multipurpose bracket being spaced apart from the second multipurpose bracket along a length of the elongate object.

In yet a further embodiment, a material forming the at least one multipurpose bracket allows the at least one multipurpose bracket to return to a shape prior to being bent when the first hook portion and/or the second hook portion of the at least one multipurpose bracket is bent by a user.

In still a further embodiment, the elongate object around which the light strand is wrapped is selected from the group consisting of a pole, a post, a tree trunk, a tree branch, a banister, a railing, and a wood fence.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 2 is a front elevational view of the multipurpose bracket of FIG. 1;

FIG. 3 is a rear elevational view of the multipurpose bracket of FIG. 1;

Throughout the figures, the same parts are always denoted using the same reference characters so that, as a general rule, they will only be described once.

DETAILED DESCRIPTION OF EMBODIMENTS OF THE INVENTION

Figure 1:
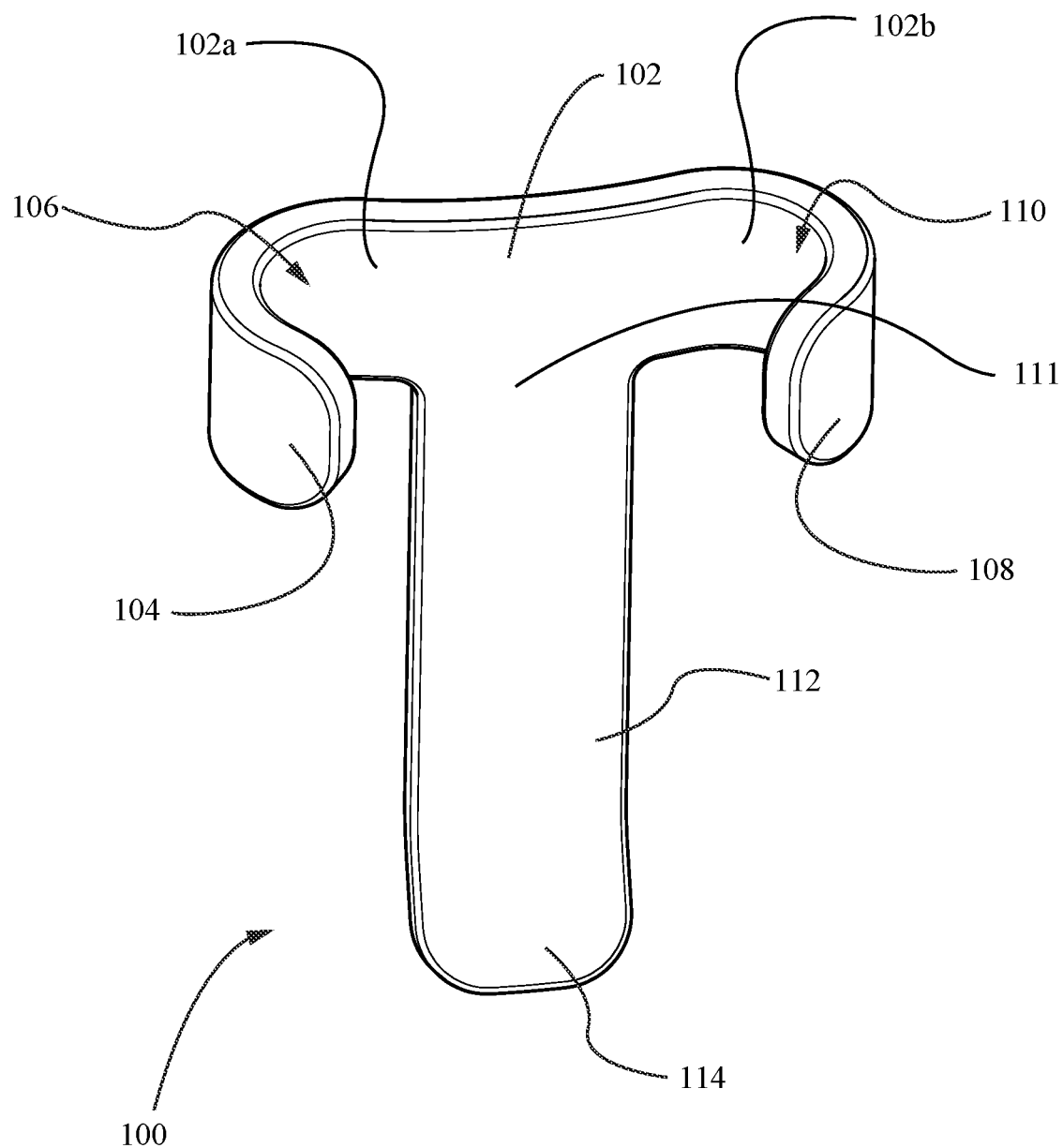
FIG. 1 is a front perspective view of a multipurpose bracket, according to a first embodiment of the invention.
Figure 4:
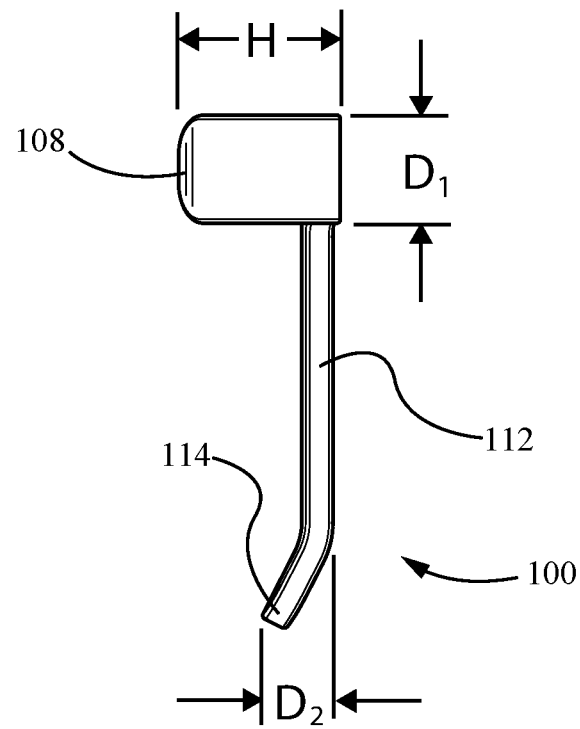
FIG. 4 is a first side view of the multipurpose bracket of FIG. 1.
Figure 5:
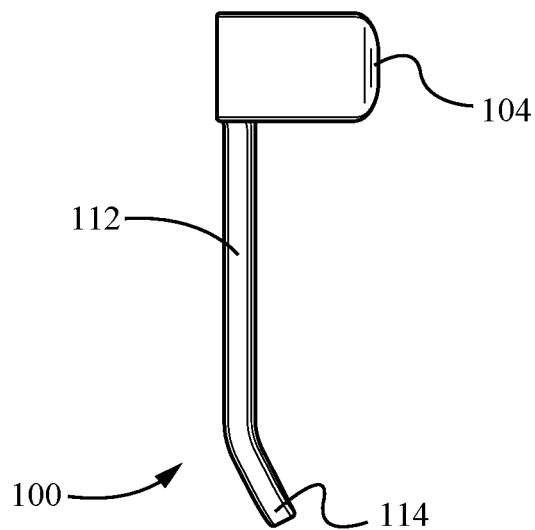
FIG. 5 is a second side view of the multipurpose bracket of FIG. 1.

A first illustrative embodiment of a multipurpose bracket is seen generally at 100 in FIGS. 1-8. Initially, as shown in the perspective view of FIG. 1, the illustrative multipurpose bracket 100 generally comprises a body portion 102 having a first side 102*a* and a second side 102*b*, the first side 102*a* of the body portion 102 being oppositely disposed relative to the second side 102*b* of the body portion 102; a first hook portion 104 attached to the first side 102*a* of the body portion 102, the first hook portion 104 being inwardly directed towards a middle of the body portion 102, the first hook portion 104 defining a first channel 106 for receiving a first wiring portion 124 of a light strand; and a second hook portion 108 attached to the second side 102*b* of the body portion 102, the second hook portion 108 being inwardly directed towards the middle of the body portion 102, the second hook portion 108 defining a second channel 110 for receiving a second wiring portion 126 of the light strand.

Figure 6:
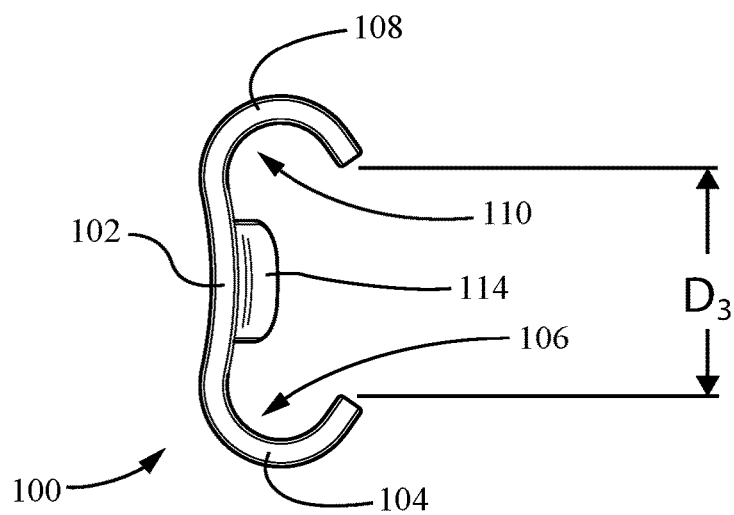
FIG. 6 is a top plan view of the multipurpose bracket of FIG. 1.
Figure 7:
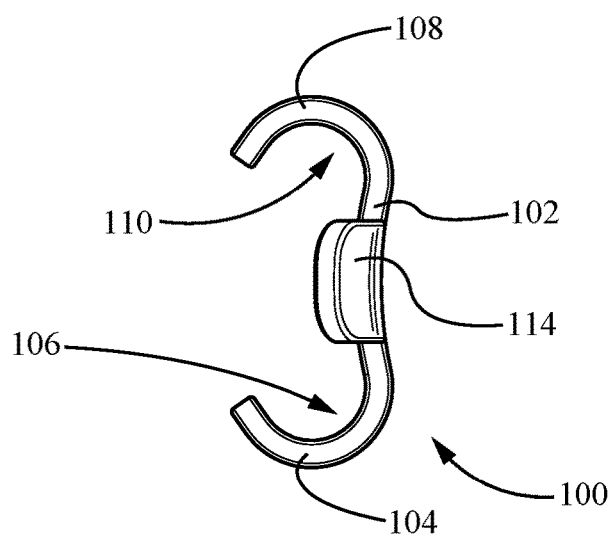
FIG. 7 is a bottom plan view of the multipurpose bracket of FIG. 1.

In the illustrative embodiment, with reference to FIGS. 1, 6, and 7, it can be seen that the first hook portion 104 and the second hook portion 108 are disposed in an opposed relationship relative to one another. Also, in the illustrative embodiment, each of the first hook portion 104 and the second hook portion 108 is curved in an arc shape that approximates a half-circle configuration (see FIGS. 6 and 7). In an alternative embodiment, the hook portions 104, 108 may have a crimped appearance instead.

Figure 8:
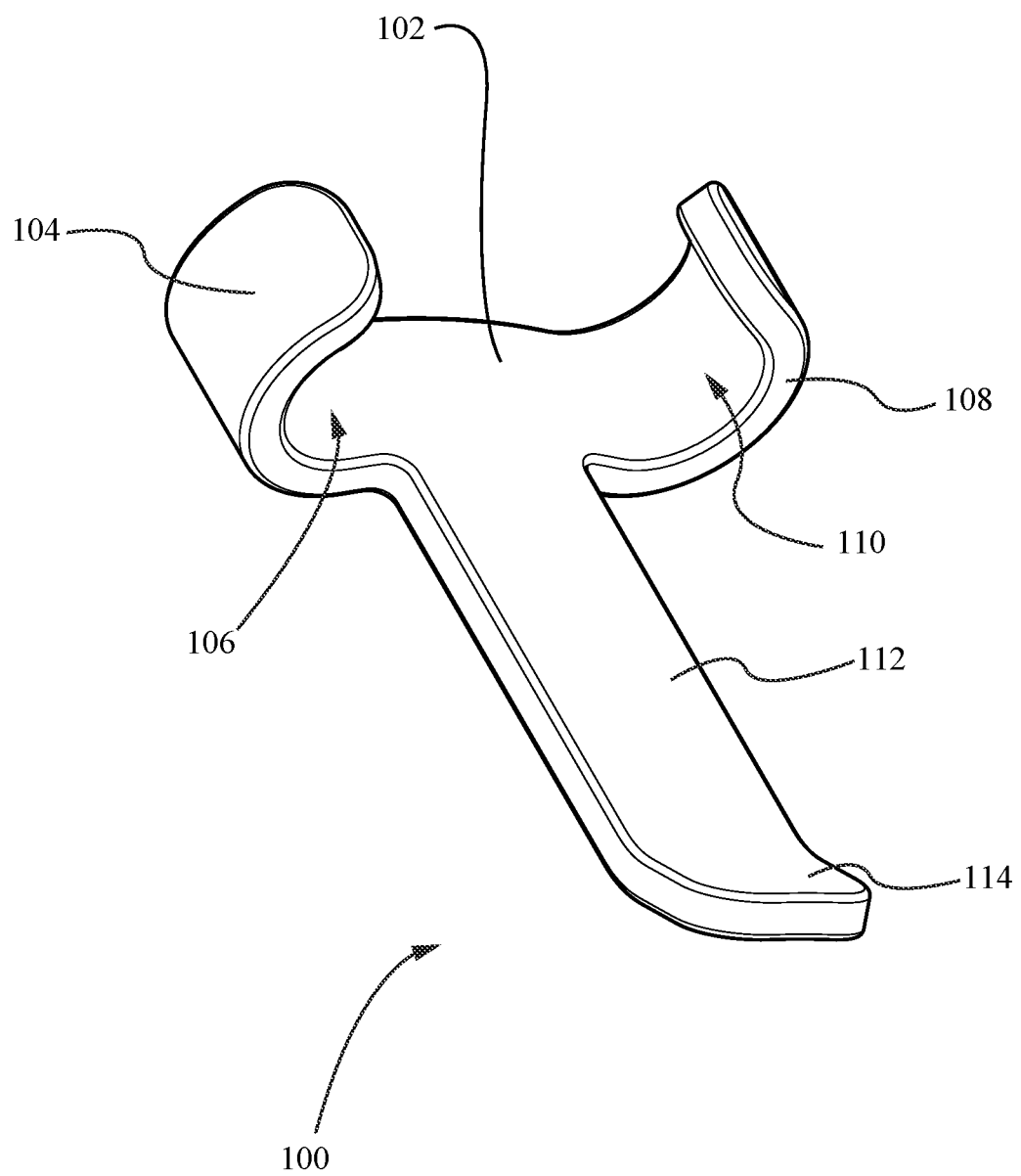
FIG. 8 is a side-front perspective view of the multipurpose bracket of FIG. 1.

As shown in FIGS. 1 and 8, in the illustrative embodiment, the first hook portion 104 and the second hook portion 108 are integrally formed with the body portion 102 (e.g., the hook portions 104, 108 and the body portion 102 are formed as a unitary plastic bracket). In alternative embodiments, the multipurpose bracket 100 may be comprised of multiple pieces of plastic, rather than being of unitary construction.

Figure 9:
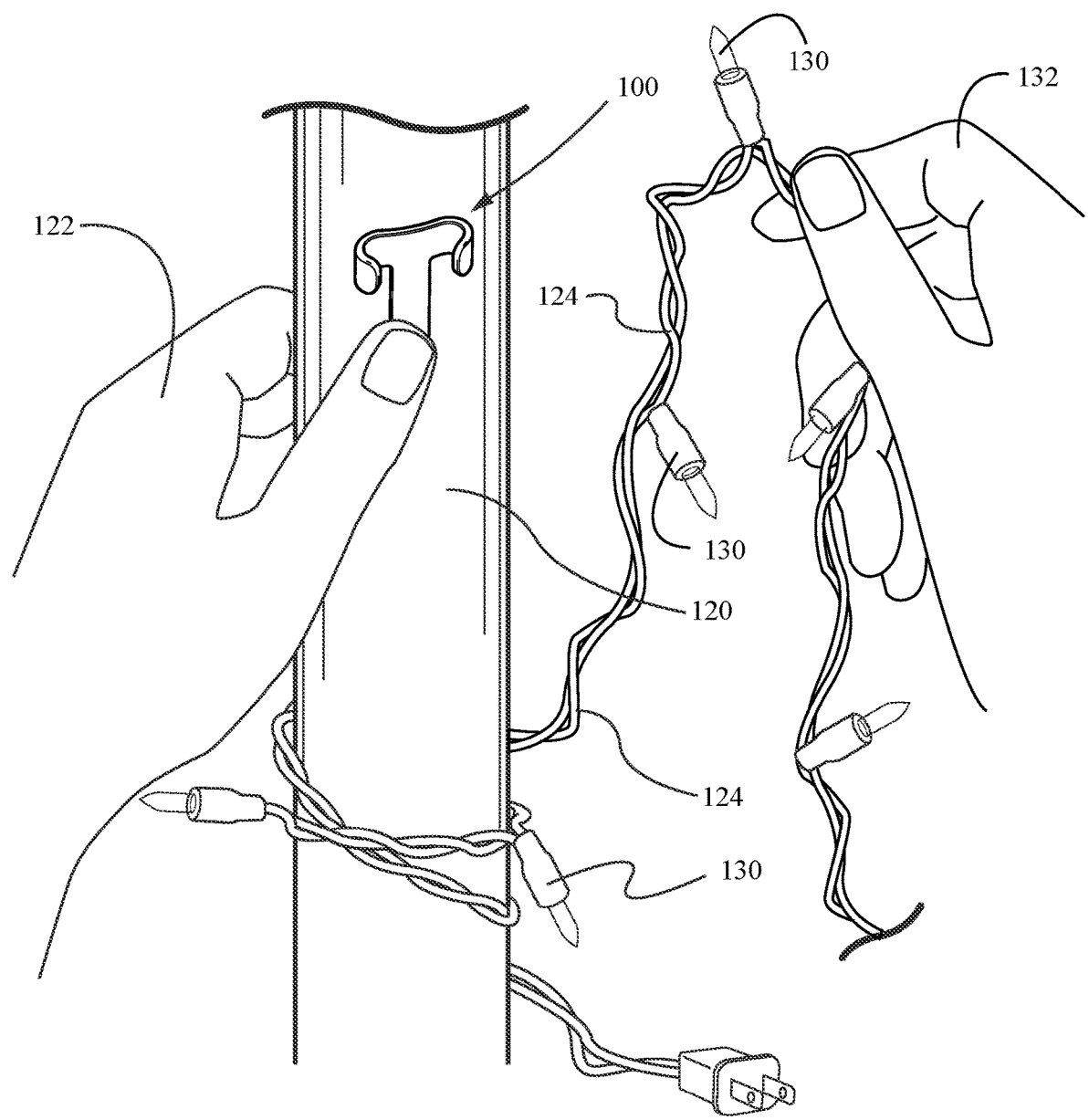
FIG. 9 is a perspective view illustrating a first step in a process of using the multipurpose bracket of FIG. 1 to attach a strand of lights around a pole.

Turning again to the illustrative embodiment of FIGS. 1-8, it can be seen that the multipurpose bracket 100 further includes a tab portion 112 that is attached to the body portion 102. The tab portion 112 is configured to facilitate a holding of the multipurpose bracket 100 by a user (see e.g., FIGS. 9-11) while the user is inserting the first and second wiring portions 124, 126 of the light strand into the multipurpose bracket 100 or removing the first and second wiring portions 124, 126 of the light strand from the multipurpose bracket 100. As shown in the illustrative embodiment of FIGS. 1-3, the tab portion 112 extends generally perpendicularly from a bottom of the body portion 102. Referring to FIGS. 1-3, it can be seen that the tab portion 112 comprises a first end 111 and a second end 114, where the second end 114 is oppositely disposed relative to the first end 111. The first end 111 of the tab portion 112 is attached to the body portion 102 (see FIGS. 1-3), and the second end 114 is angled outwardly slightly (see FIGS. 4 and 5) for facilitating the removal of the first and second wiring portions 124, 126 of the light strand from the multipurpose bracket 100. That is, the second end 114 of the tab portion 112 is disposed at a small acute angle relative to the remainder of the tab portion 112 (see FIGS. 4 and 5).

The tab portion 112 or holder may be used to hold the multipurpose bracket 100 in place while strings of lights are wrapped through the bracket 100 and around a tree or other structure. The tab portion 112 can also be used to aid in removal of the lights by making it easier to manually grab the bracket 100 (by the tab/holder portion 112) and remove it, thus releasing a cord of the string of lights.

As shown in FIGS. 1 and 8, in the illustrative embodiment, similar to the first hook portion 104 and the second hook portion 108, the tab portion 112 is also integrally formed with the body portion 102 (e.g., the hook portions 104, 108, the tab portion 112, and the body portion 102 are formed as a unitary plastic bracket). In alternative embodiments, the multipurpose bracket 100 may be comprised of multiple pieces of plastic, rather than being of unitary construction. The plastic may be flexible enough to allow a user to slightly bend the hooks 104, 108 of the bracket 100 to insert a light strand, and yet allow the bracket 100 to thereafter return to its original shape. In other embodiments, a hard plastic with no flexibility may be used. One of ordinary skill in the art will also recognize that in various embodiments different materials (e.g., wire, plastic, rubber, foam, wood, metal, etc.) may be used as desired without departing from the concept of the invention.

FIGS. 9-13 illustrate the manner in which the multipurpose bracket 100 of the illustrative embodiment may be used to hold strands of lights around a pole 120 (e.g., a strand of Christmas lights). It is to be understood that the same technique illustrated in FIGS. 9-13 may be used to wrap strands of lights around other objects, such as tree trunks and/or branches, posts, banisters, railings, wood fences, pergolas, etc. It will be recognized by one of ordinary skill in the art that the multipurpose brackets 100 may be used to hold items onto not only tree trunks and/or branches, posts, railings, wood fences, and pergolas, but a myriad of other items and structures around the home and yard. Also, the multipurpose brackets 100 may be used to hold items on various structures located on other non-residential properties, such as commercial properties (e.g., in malls, parks, zoos, etc.). In general, when using the multipurpose bracket 100, a user may place a strand through the channel 110 on one side of the body portion 102, wrap the lights around the pole or trunk, and then place a second section of the strand of lights in the other channel 106 on the other side of the body portion 102. It is also recognized that the multipurpose bracket 100 may be similarly used with garland or other items.

Figure 10:
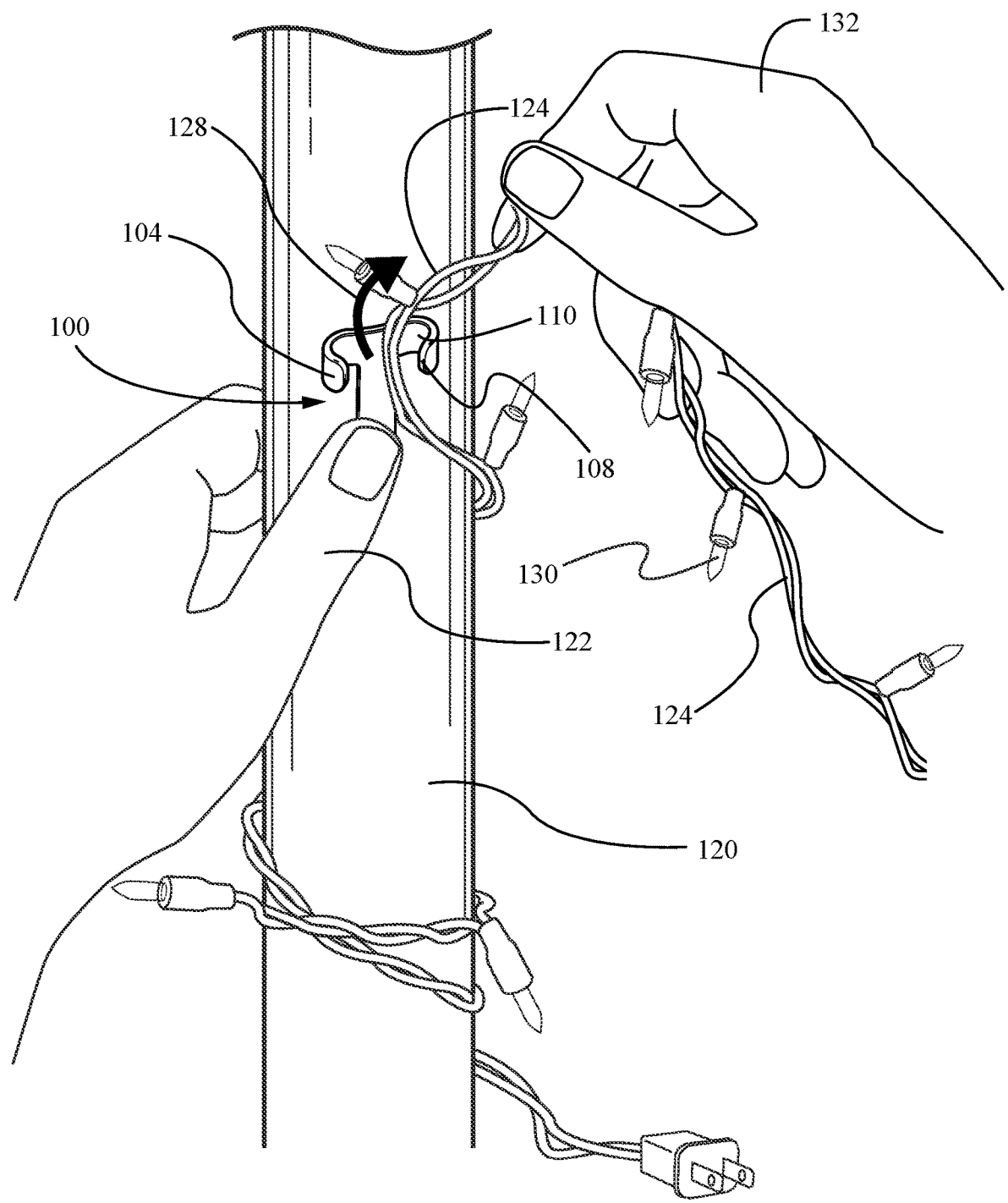
FIG. 10 is a perspective view illustrating a second step in the process of using the multipurpose bracket of FIG. 1 to attach the strand of lights around the pole.
Figure 11:
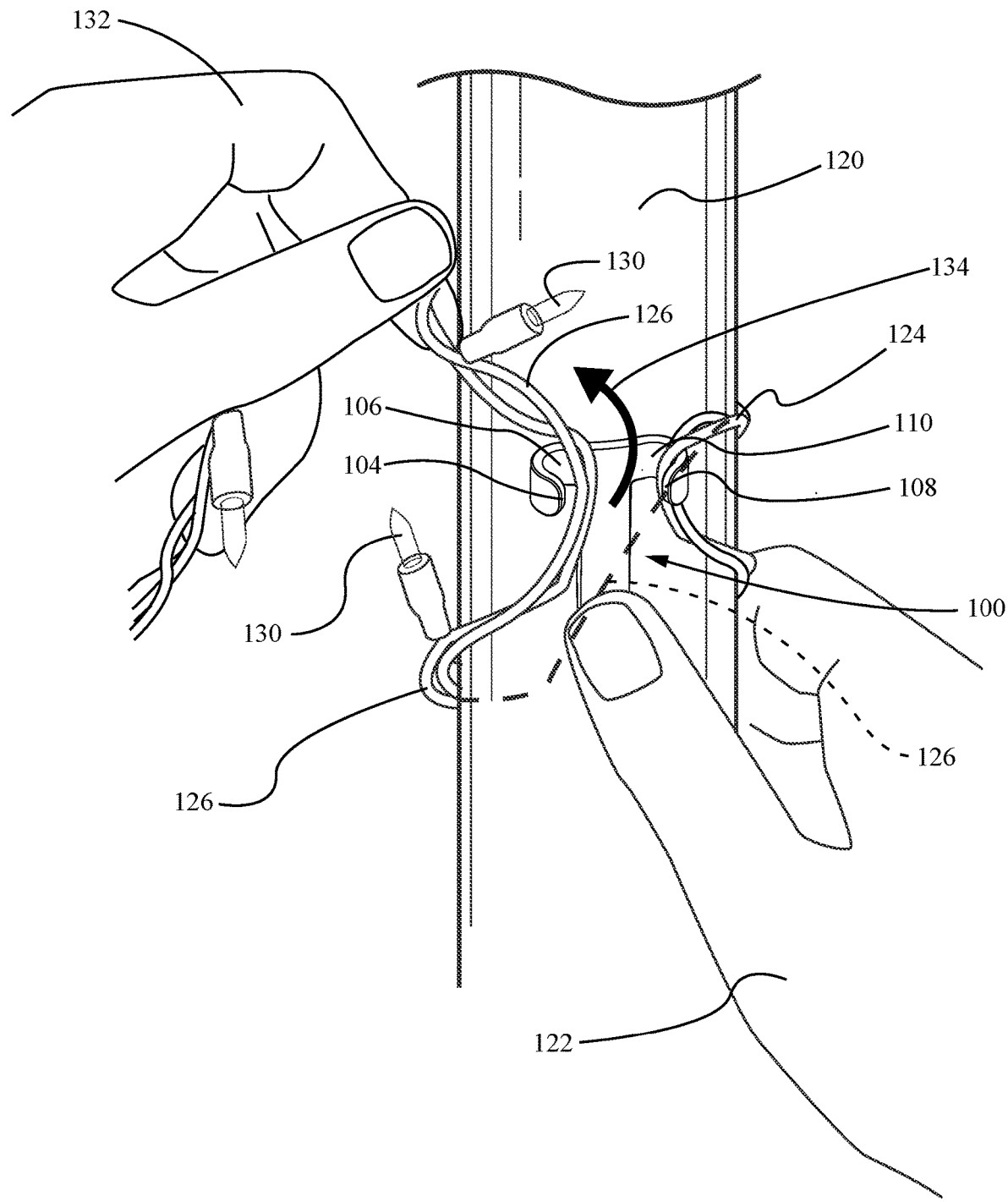
FIG. 11 is a perspective view illustrating a third step in the process of using the multipurpose bracket of FIG. 1 to attach the strand of lights around the pole.
Figure 12:
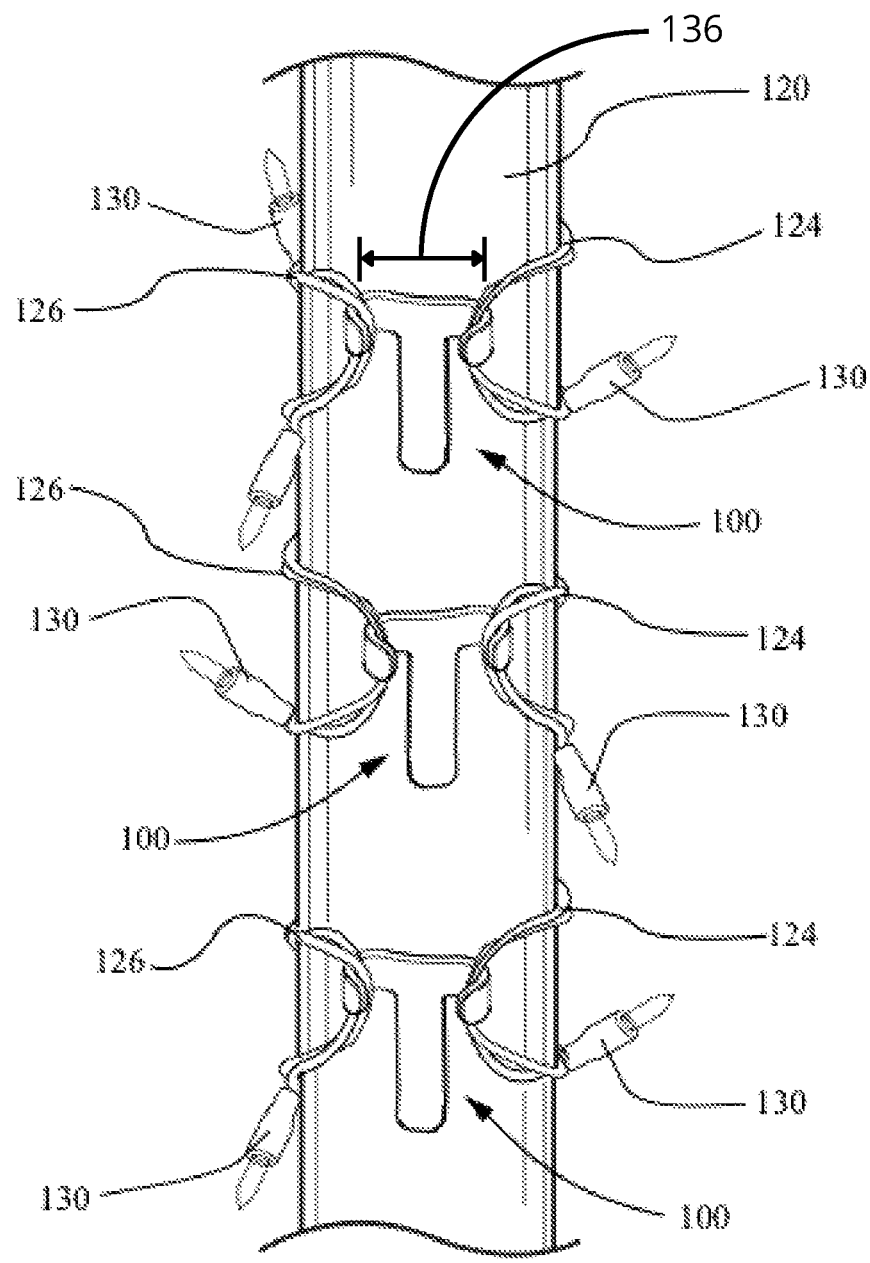
FIG. 12 is a rear perspective view illustrating a plurality of multipurpose brackets being used to attach the strand of lights around the pole.
Figure 13:
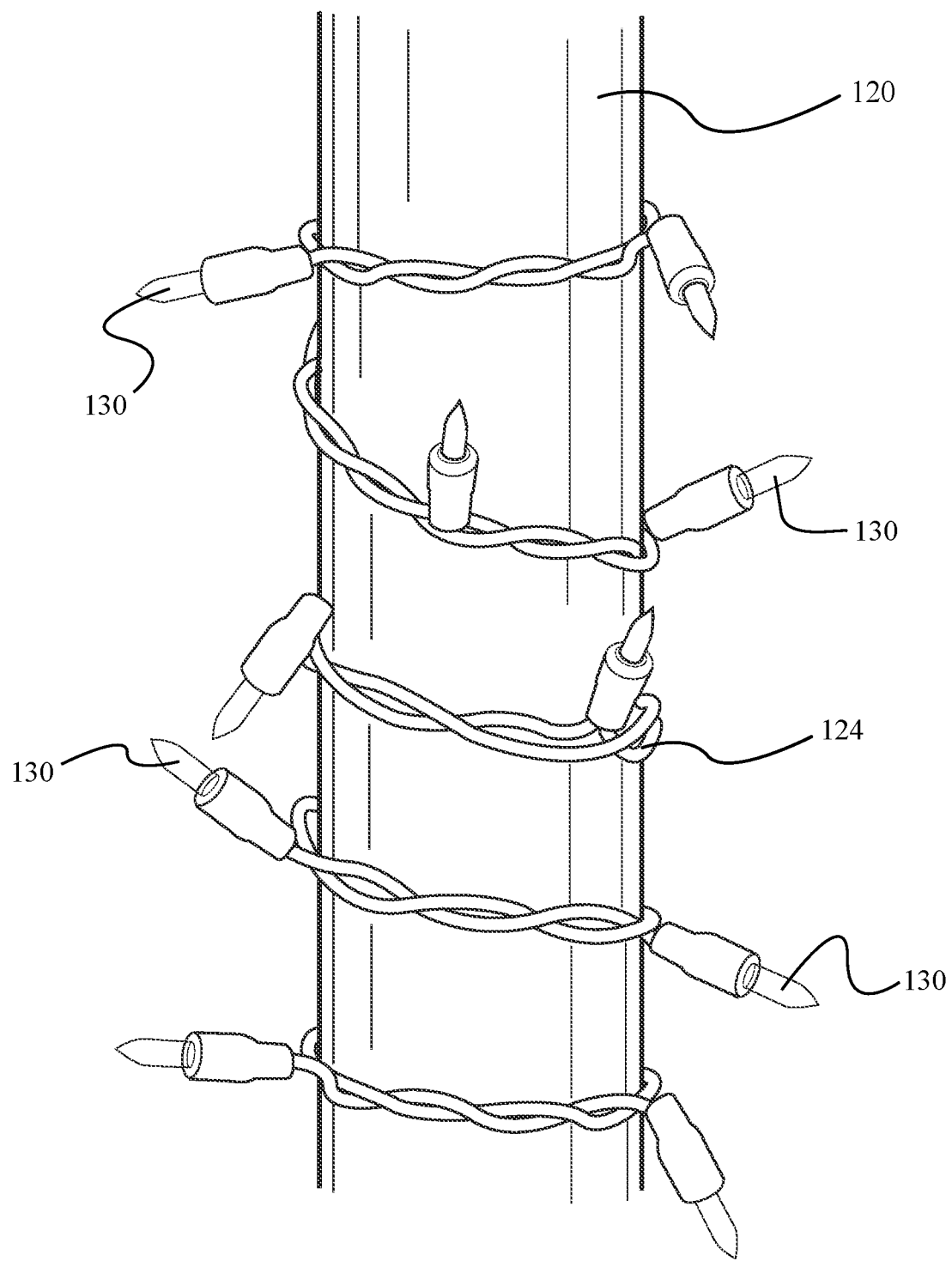
FIG. 13 is a front perspective view of the strand of lights that are attached around the pole using multipurpose brackets.
Figure 14:
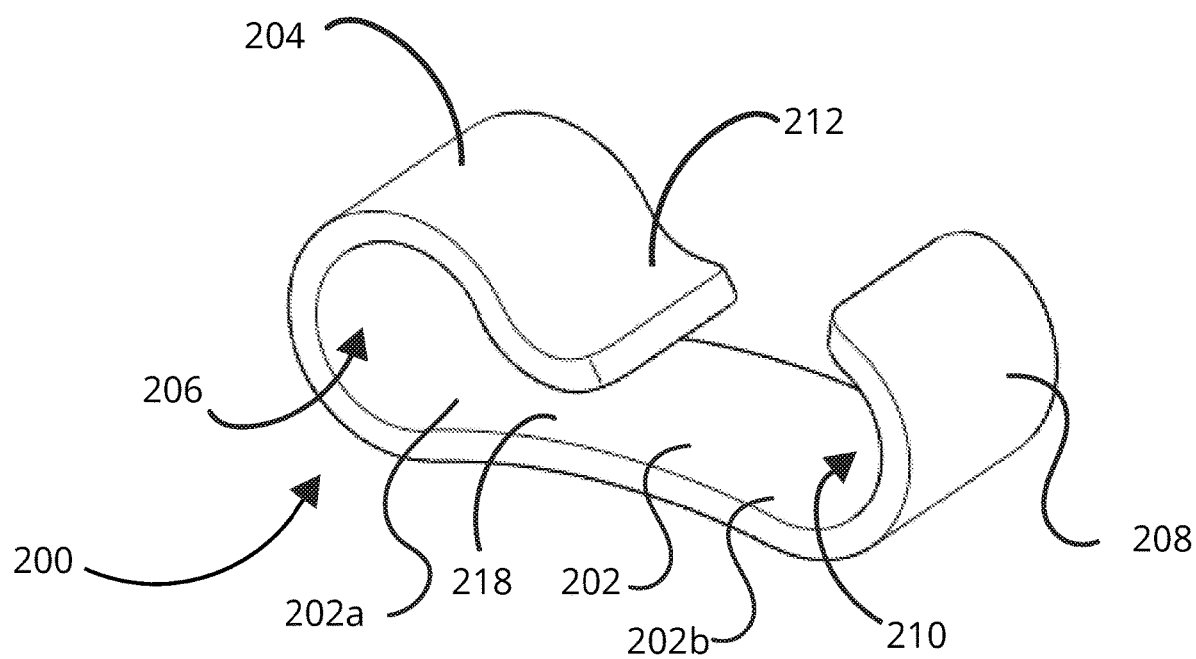
FIG. 14 is a side perspective view of a multipurpose bracket, according to a second embodiment of the invention.

The use of the multipurpose bracket 100 will be described in more detail with reference to FIGS. 9-13. First of all, the user tightly secures the light strand to the site (e.g., a pole 120) that he or she is wrapping (e.g., by tying the end of the wiring to the site using a knot or other suitable fastening means, such as a twist tie, rope, clip, band, tape, etc.). Then, using a first hand 122, the user holds the multipurpose bracket 100 in place a predetermined distance (e.g., 4 to 6 inches) from his or her starting point (see FIG. 9). Next, as shown in FIG. 10, the user wraps the light strand around the structure (e.g., the pole 120), and loops a first wiring portion 124 of the light strand around a first one of the hooks 108 (e.g., as diagrammatically represented by the curved arrow 128 in FIG. 10). The first wiring portion 124 of the light strand is received within the channel 110 defined by the hook 108. As shown in FIG. 10, the user continues to hold the multipurpose bracket 100 using his or her hand 122 while the first wiring portion 124 is being wrapped around the first one of the hooks 108. The user also maintains tension on the light strand while the wrapping the pole 120. After the step depicted in FIG. 10, the light strand is wrapped back around the pole 120, and a second wiring portion 126 of the light strand is looped around a second one of the hooks 104 by the second hand 132 of the user, bottom to top (e.g., as diagrammatically represented by the curved arrow 134 in FIG. 11). The second wiring portion 126 of the light strand is received within the channel 106 defined by the hook 104. After the second wiring portion 126 of the light strand is inserted into the channel 106, the user is able to let go of the multipurpose bracket 100 (because the tension will hold it in place), and repeat the steps of the process with another multipurpose bracket 100. FIG. 12 illustrates a rear view of the pole 120 with a plurality of multipurpose brackets 100 being used to attach the light strand with lights 130 around the pole 120. As shown in FIG. 12, the second looped wiring portion 126 in the second channel of the multipurpose bracket 100 is spaced apart from the first looped wiring portion 124 in the first channel by a gap 136 extending in the width direction of the multipurpose bracket 100. FIG. 13 illustrates a front view of the pole 120 with the light strand with lights 130 wrapped therearound (the multipurpose brackets 100 are not visible from the front view of the pole 120 so the brackets 100 do not take away from the aesthetics of the light wrapped pole 120).

In the illustrative embodiment, referring to FIG. 2, the multipurpose bracket 100 may have an overall length L of approximately 38 millimeters (mm), and the multipurpose bracket 100 may have an overall width W of approximately 27.5 millimeters (mm). Also, in the illustrative embodiment, with reference to FIG. 4, the multipurpose bracket 100 may have an overall height H of approximately 12 millimeters (mm). In addition, referring to FIG. 4 of the illustrative embodiment, the body portion 102 of the multipurpose bracket 100 may have a width $D_1$ of approximately 8 millimeters (mm), and the angled second end 114 of the tab portion 112 of the multipurpose bracket 100 may protrude outwardly by a distance D2 of approximately 5 millimeters (mm). Turning to FIG. 6 of the illustrative embodiment, the separation distance $D_3$ between the pair of opposed hook portions 104, 108 may be approximately 17 millimeters (mm).

A second illustrative embodiment of a multipurpose bracket is seen generally at 200 in FIGS. 14-20. Initially, as shown in the perspective view of FIG. 14, the illustrative multipurpose bracket 200 generally comprises a body portion 202 having a first side 202*a* and a second side 202*b*, the first side 202*a* of the body portion 202 being oppositely disposed relative to the second side 202*b* of the body portion 202; a first hook portion 204 attached to the first side 202*a* of the body portion 202, the first hook portion 204 being inwardly directed or bent towards a middle of the body portion 202, the first hook portion 204 defining a first channel 206 for receiving a first wiring portion of a light strand (see FIGS. 19 and 20); and a second hook portion 208 attached to the second side 202*b* of the body portion 202, the second hook portion 208 being inwardly directed or bent towards the middle of the body portion 202, the second hook portion 208 defining a second channel 210 for receiving a second wiring portion of the light strand.

Figure 15:
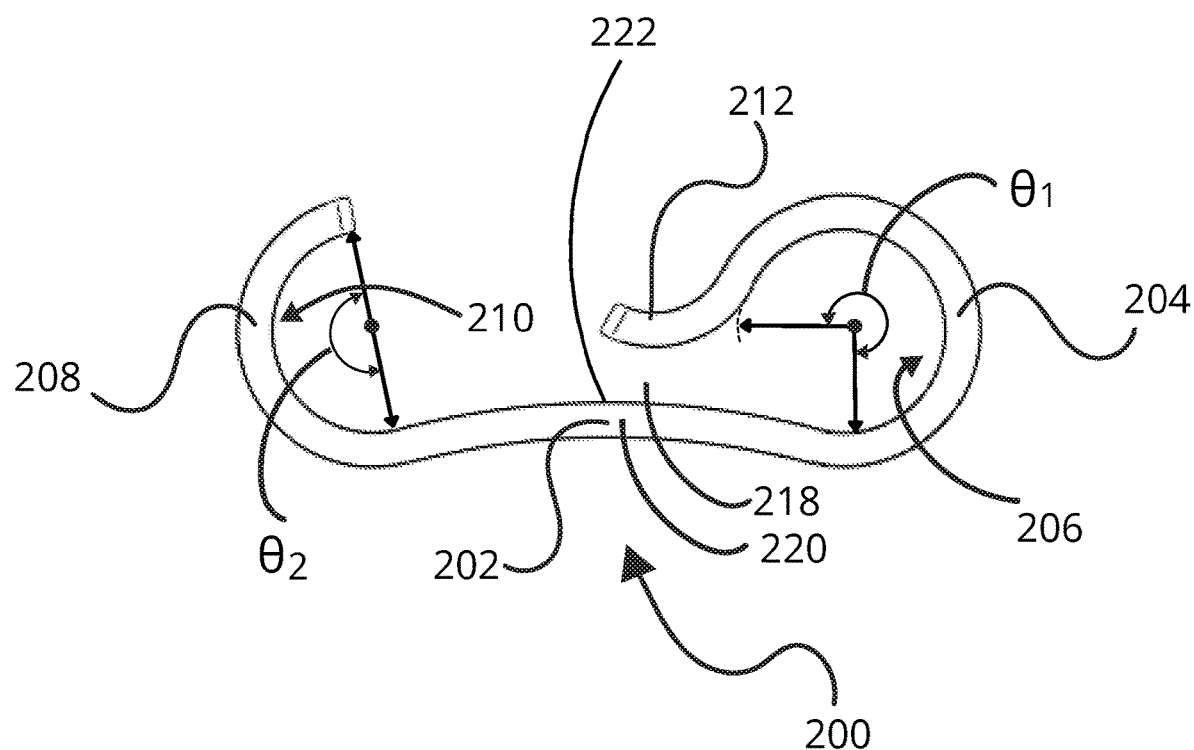
FIG. 15 is a top plan view of the multipurpose bracket of FIG. 14.
Figures 16, 17:
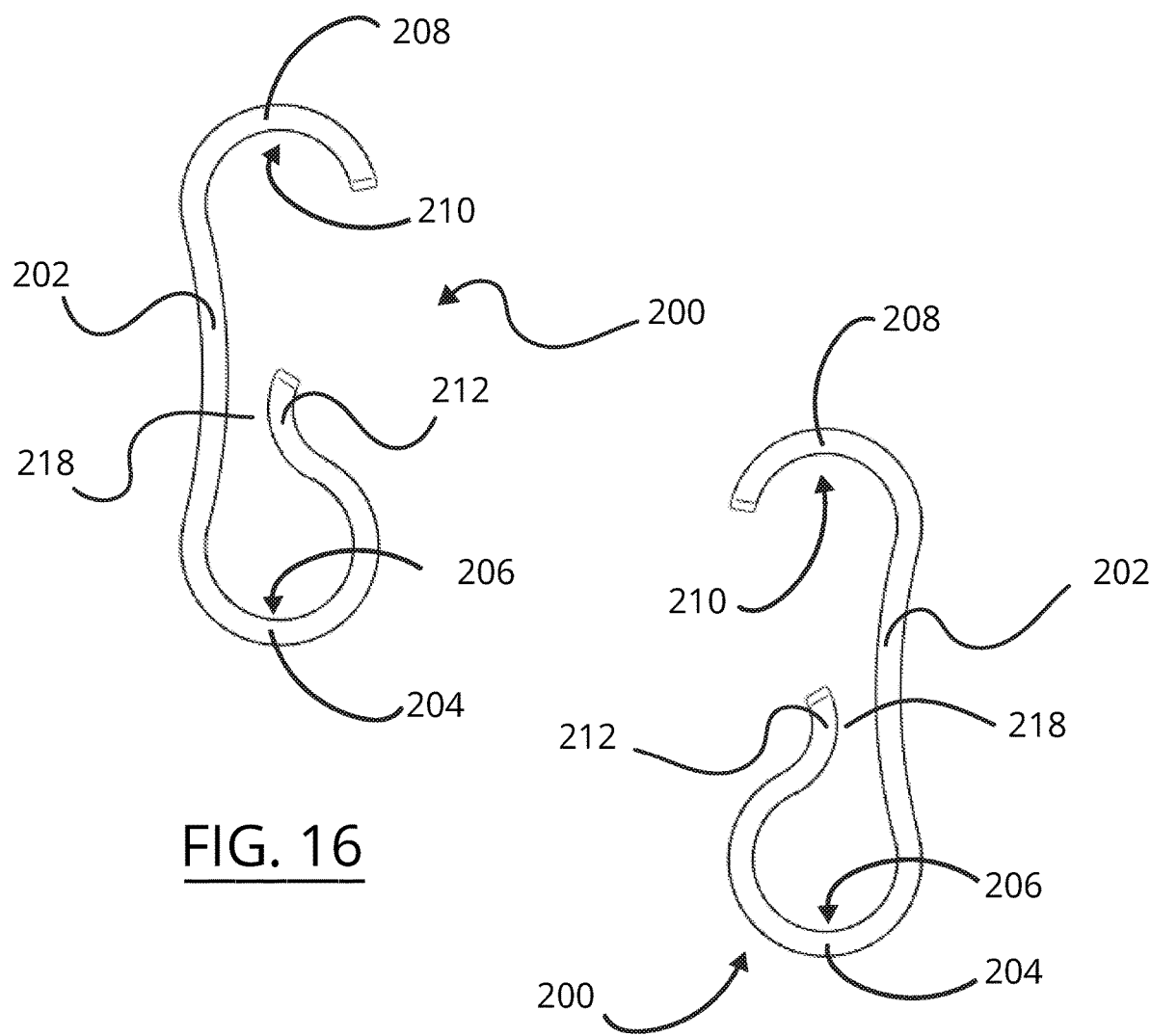
FIG. 16 is another top plan view of the multipurpose bracket of FIG. 14.
FIG. 17 is a bottom plan view of the multipurpose bracket of FIG. 14.
Figure 18:
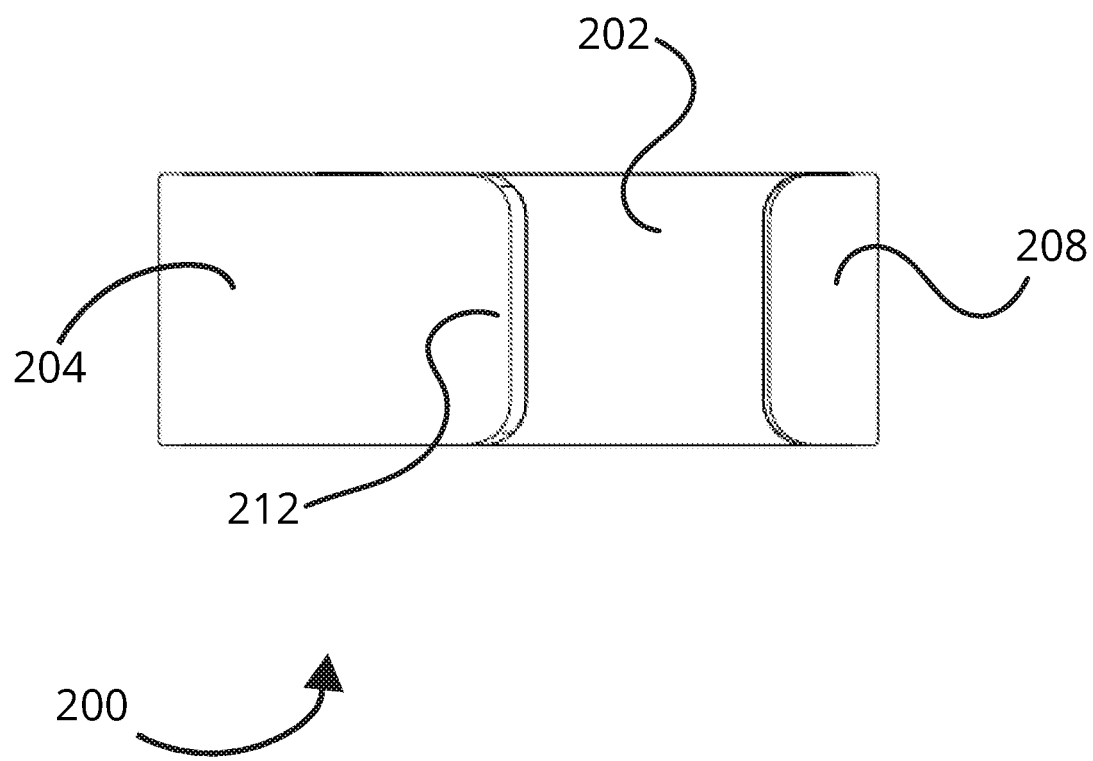
FIG. 18 is a front elevational view of the multipurpose bracket of FIG. 14.

In the second illustrative embodiment, with reference to FIGS. 14-17, it can be seen that the first hook portion 204 and the second hook portion 208 are disposed in an opposed relationship relative to one another. As shown in these figures, in the second illustrative embodiment, the first hook portion 204 is curved in an arc shape that approximates a three-quarter circle configuration (e.g., the angle $\theta_1$ is approximately 270 degrees, or between 250 degrees and 280 degrees, inclusive—see FIG. 15). Also, as shown in these figures, in the second illustrative embodiment, the second hook portion 208 is curved in an arc shape that approximates a half-circle configuration (e.g., the angle $\theta_2$ is approximately 180 degrees, or between 170 degrees and 190 degrees, inclusive—see FIG. 15). Also, as shown in FIG. 15, the rear surface of the body portion 202 has a concave curvature 220 defining a central apex 222, and the first hook portion 204 has a free end that is proximate to the central apex 222 of the body portion 202.

Figure 19:
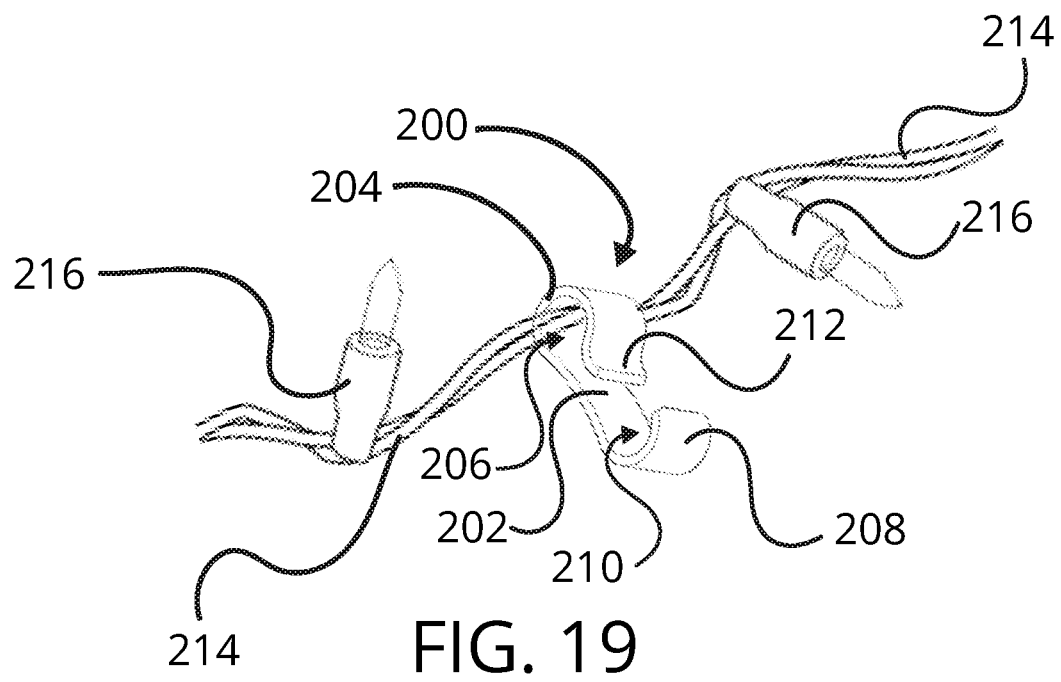
FIG. 19 is a first perspective view illustrating the multipurpose bracket of FIG. 14 attached to a strand of lights.
Figure 20:
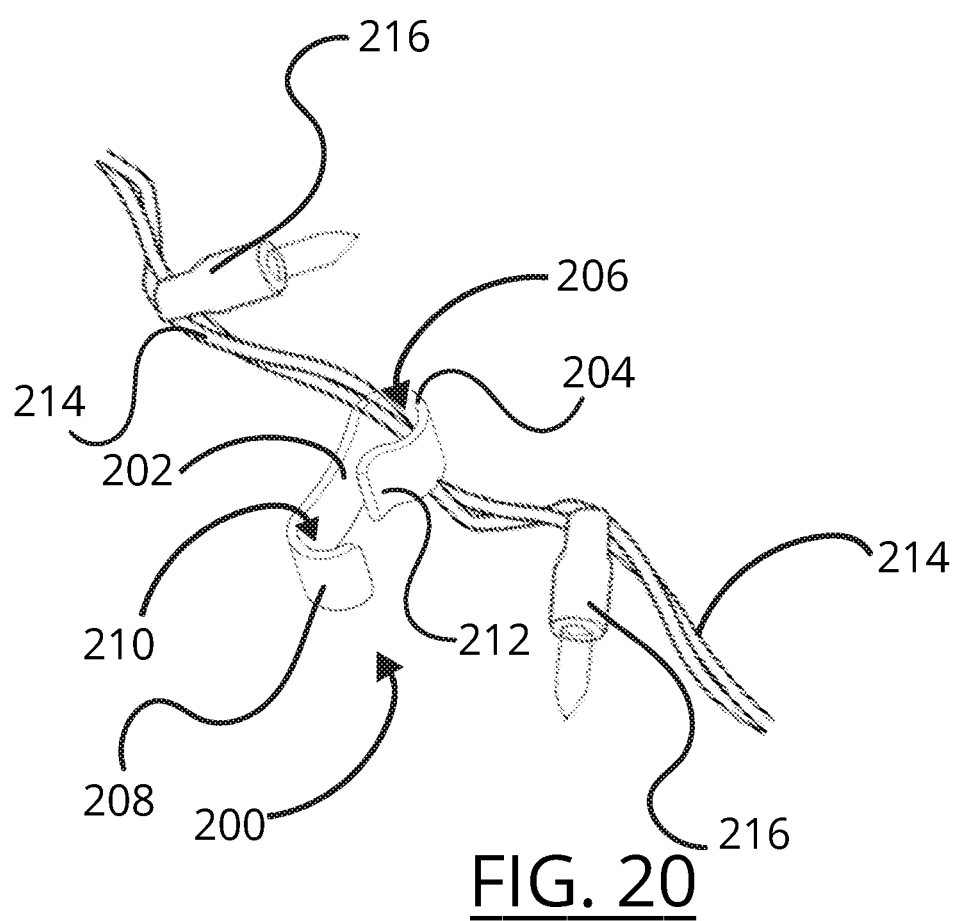
FIG. 20 is a second perspective view illustrating the multipurpose bracket of FIG. 14 attached to a strand of lights.

In the second illustrative embodiment, the first hook portion 204 with the three-quarter circle configuration advantageously allows the first wiring portion of the light strand to remain inside the first channel 206 without the multipurpose bracket 200 inadvertently falling off the light strand (see FIGS. 19 and 20). When the first wiring portion of the light strand is inserted into the first channel 206, the first hook portion 204 can be temporarily bent by user to allow passage of the wiring portion into the channel 206, but then the first hook portion 204 bends back to its original shape once a user releases the first hook portion 204, thus coupling the multipurpose bracket 200 to the light strand so that the multipurpose bracket 200 will not fall off. The multipurpose bracket 200 can be removed from the light strand by slipping the wiring portion back out of the channel 206 as the user temporarily bends the first hook portion 204 away from the body portion 202 so as to enable the wiring portion to be slid out of the channel 206.

As shown in FIGS. 14-17, in the illustrative embodiment, the first hook portion 204 and the second hook portion 208 are integrally formed with the body portion 202 (e.g., the hook portions 204, 208 and the body portion 202 are formed as a unitary plastic bracket). In alternative embodiments, the multipurpose bracket 200 may be comprised of multiple pieces of plastic, rather than being of unitary construction.

Turning again to the second illustrative embodiment of FIGS. 14-17, it can be seen that the multipurpose bracket 200 further includes an upturned end portion 212 that is attached to the first hook portion 204. The upturned end portion 212 is angled outwardly slightly for facilitating the removal of the multipurpose bracket 200 from a wiring portion of a light strand (see FIGS. 19 and 20). That is, a user grasps the upturned end portion 212 to bend the first hook portion 204 away from the body portion 202 so that the wiring portion of the light strand is able to be slid out of the channel 206 by temporarily expanding the gap 218 between the upturned end portion 212 and the body portion 202.

The method of using the multipurpose bracket 200 to attach strands of lights around a pole 120 is generally the same as that described above for the first illustrative embodiment of the multipurpose bracket 100, except that the first looped wiring portion of the light strand may be inserted into the first channel 206 defined by the first hook portion 204 of each of a plurality of multipurpose brackets 200 prior to the light strand being wrapped around the pole 120. For example, as shown in FIGS. 19 and 20, the wiring portion 214 of the light strand with lights 216 is inserted into the first channel 206 defined by the first hook portion 204 of the multipurpose bracket 200 prior to the light strand being wrapped around a pole. Advantageously, the pre-coupling of the multipurpose brackets 200 to the light strand prior to the light strand being wrapped around a pole makes the wrapping of the pole with lights easier because the strand wiring portion only has to be inserted into the second channel 210 defined by the second hook portion 208 of the multipurpose bracket 200 when the light strand is actually being wrapped around the pole.

In an alternative embodiment, the multipurpose bracket may comprise an elongated body portion with two arms or hooks on either end that are displaced orthogonally from the elongated body and then turn in and run parallel to the elongated body and towards the interior of the elongated body. In this alternative embodiment, a channel is created on either end of the elongated body between the body and the arms. The multipurpose bracket of this alternative embodiment does not include the tab portion extending from the body of the bracket. Also, in this alternative embodiment, the multipurpose bracket may be formed as a unitary piece which may be comprised of wire, plastic, or another material that can resist deformation during use. This alternative embodiment of the bracket may be made in various dimensions as desired. In some embodiments, the bracket may be approximately 1.25 inches in length, approximately 0.5 inches in height, and approximately 0.5 inches in width. In other embodiments, the bracket may be approximately 2 inches in length, approximately 0.5 inches in height, and approximately inches in width. In yet other embodiments, the bracket may be approximately 3 inches in length, approximately 1 inch in height, and approximately 1 inch in width.

In another alternative embodiment, the multipurpose bracket may comprise an elongated body portion that is formed from more than two wire portions, but where each side of the body portion is formed from two wires.

In yet another alternative embodiment, the multipurpose bracket may comprise hooks or arms that are shifted or offset such that they are not directly across from one another. One of ordinary skill in the art will recognize that the offset of the hooks or arms could be done in various ways without departing from the concept of the invention.

It is readily apparent that the aforedescribed multipurpose bracket 100 offers numerous advantages. The multipurpose bracket 100, 200 facilitates the temporary or permanent installation of string lights, garland, or other such objects on tree trunks and limbs, and on other structures. The multipurpose bracket 100, 200 can be used to hold decorations and the like to structures, rather than the known standard of wrapping the string lights around and around the structure to hold them in place. The multipurpose bracket 100, 200 allows for the illusion of wrapping, but does not require the actual act of wrapping the object. The multipurpose bracket 100 enables the wrapping and unwrapping of string lights in an easier and faster manner, and thus is ideal for everyday lighting or holiday lighting. Using the multipurpose bracket 100, 200 allows one to reduce the time spent hanging up and taking down lights anywhere a person wants to wrap string lights.

The multipurpose bracket 100, 200 includes the following features: (i) the bracket 100, 200 is easy to use, (ii) the bracket 100, 200 is suitable for both indoor and outdoor use, (iii) the bracket 100, 200 will work with most string lights, and (iv) the bracket 100, 200 will not damage trees or other surfaces. Advantageously, using the multipurpose brackets 100, 200 for hanging light strands obviates the need for zip ties, staples, and the tedious feeding of the entire light strand around and around through tight spaces. Also, the multipurpose brackets 100, 200 obviate the problems associated with the balling of the light strands during installation.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A multipurpose bracket, comprising:
a body portion having a first side, a second side, a front surface, and a rear surface, the first side of the body portion being oppositely disposed relative to the second side of the body portion, the rear surface of the body portion being oppositely disposed relative to the front surface of the body portion, the rear surface of the body portion configured to be disposed against an object around which a light strand is wrapped, and the rear surface of the body portion having a concave curvature defining a central apex;
a first hook portion attached to the first side of the body portion, the first hook portion being inwardly directed towards a middle of the body portion, the first hook portion defining a first channel for receiving a first wiring portion of the light strand, the first hook portion having a free end that is proximate to the central apex of the body portion; and
a second hook portion attached to the second side of the body portion, the second hook portion being inwardly directed towards the middle of the body portion, the second hook portion defining a second channel for receiving a second wiring portion of the light strand.

2. The multipurpose bracket according to claim 1, wherein the first hook portion is curved in an arc shape that approximates a three-quarter circle configuration.

3. The multipurpose bracket according to claim 2, further comprising an upturned end portion that is attached to the first hook portion which approximates the three-quarter circle configuration, the upturned end portion being angled outwardly slightly for facilitating the removal of the multipurpose bracket from a wiring portion of a light strand.

4. The multipurpose bracket according to claim 2, wherein the second hook portion is curved in an arc shape that approximates a half-circle configuration.

5. The multipurpose bracket according to claim 1, wherein the first hook portion and the second hook portion are disposed in an opposed relationship relative to one another.

6. The multipurpose bracket according to claim 1, wherein the first hook portion and the second hook portion are integrally formed with the body portion.

7. A method of using a multipurpose bracket, the method comprising the steps of:
providing an elongate object;
providing a light strand having a first looped wiring portion, a second looped wiring portion, and a connecting wiring portion that connects the first looped wiring portion to the second looped wiring portion;
providing at least one multipurpose bracket, the at least one multipurpose bracket including:
a body portion having a first side, a second side, a front surface, and a rear surface, the first side of the body portion being oppositely disposed relative to the second side of the body portion, the rear surface of the body portion being oppositely disposed relative to the front surface of the body portion;
a first hook portion attached to the first side of the body portion, the first hook portion being inwardly directed towards a middle of the body portion, the first hook portion defining a first channel for receiving a first wiring portion of a light strand, and the front surface of the body portion facing the first channel; and
a second hook portion attached to the second side of the body portion, the second hook portion being inwardly directed towards the middle of the body portion, the second hook portion defining a second channel for receiving a second wiring portion of the light strand, and the front surface of the body portion facing the second channel;
inserting the first looped wiring portion of the light strand into the first channel defined by the first hook portion of the at least one multipurpose bracket;
wrapping an initial portion of the light strand around the elongate object;
placing the rear surface of the body portion of the at least one multipurpose bracket against an outer surface of the elongate object around which the portion of the light strand is wrapped, the multipurpose bracket being disposed on a first side of the elongate object;
wrapping the connecting wiring portion of the light strand around a second side of the elongate object that is opposite to the first side of the elongate object; and
inserting the second looped wiring portion of the light strand into the second channel defined by the second hook portion of the at least one multipurpose bracket, the second looped wiring portion in the second channel being generally aligned with the first looped wiring portion in the first channel in a width direction of the at least one multipurpose bracket, and the second looped wiring portion in the second channel being spaced apart from the first looped wiring portion in the first channel by a gap extending in the width direction of the at least one multipurpose bracket.

8. The method according to claim 7, wherein the first hook portion of the at least one multipurpose bracket is curved in an arc shape that approximates a three-quarter circle configuration.

9. The method according to claim 8, wherein the at least one multipurpose bracket further comprises an upturned end portion that is attached to the first hook portion which approximates the three-quarter circle configuration, the upturned end portion being angled outwardly slightly for facilitating the removal of the multipurpose bracket from a wiring portion of a light strand.

10. The method according to claim 8, wherein the second hook portion of the at least one multipurpose bracket is curved in an arc shape that approximates a half-circle configuration.

11. The method according to claim 7, wherein the first hook portion and the second hook portion of the at least one multipurpose bracket are disposed in an opposed relationship relative to one another.

12. The method according to claim 7, wherein the first hook portion and the second hook portion of the at least one multipurpose bracket are integrally formed with the body portion.

13. The method according to claim 7, wherein the at least one multipurpose bracket comprises a plurality of multipurpose brackets, the plurality of multipurpose brackets including a first multipurpose bracket and a second multipurpose bracket that are disposed on the first side of the elongate object, and the first multipurpose bracket being spaced apart from the second multipurpose bracket along a length of the elongate object.

14. The method according to claim 7, wherein a material forming the at least one multipurpose bracket allows the at least one multipurpose bracket to return to a shape prior to being bent when the first hook portion and/or the second hook portion of the at least one multipurpose bracket is bent by a user.

15. The method according to claim 7, wherein the elongate object around which the light strand is wrapped is selected from the group consisting of a pole, a post, a tree trunk, a tree branch, a banister, a railing, and a wood fence.

* * * * *